(12) United States Patent
Koplin

(10) Patent No.: US 7,243,909 B2
(45) Date of Patent: Jul. 17, 2007

(54) COLLECTOR SUMP COOLING TOWER

(76) Inventor: Edward C. Koplin, 2254 Monocacy Rd., Essex, MD (US) 21221

( * ) Notice: Subject to any disclaimer, the term of this patent is extended or adjusted under 35 U.S.C. 154(b) by 18 days.

(21) Appl. No.: 11/298,077

(22) Filed: Dec. 9, 2005

(65) Prior Publication Data

US 2006/0125124 A1   Jun. 15, 2006

Related U.S. Application Data

(60) Provisional application No. 60/635,261, filed on Dec. 10, 2004.

(51) Int. Cl.
*B01F 3/04* (2006.01)

(52) U.S. Cl. ............... 261/29; 261/36.1; 261/38; 261/72.1; 261/DIG. 11

(58) Field of Classification Search ........... 261/152, 261/153, 157, 29, 38, 36.1, 72.1, 94, 95, 261/112.1, 125, DIG. 11
See application file for complete search history.

(56) References Cited

U.S. PATENT DOCUMENTS

| | | | | | |
|---|---|---|---|---|---|
| 2,732,190 | A | * | 1/1956 | Mart | 261/21 |
| 2,984,991 | A | * | 5/1961 | Morgan | 62/121 |
| 3,265,122 | A | * | 8/1966 | Ostrander | 165/60 |
| 3,290,867 | A | * | 12/1966 | Jacir | 96/365 |
| 3,775,993 | A | * | 12/1973 | Murphy | 62/95 |
| 3,805,880 | A | * | 4/1974 | Lawlar | 165/60 |
| 4,007,241 | A | * | 2/1977 | Phelps | 261/149 |
| 4,008,709 | A | | 2/1977 | Jardine | |
| 4,010,731 | A | | 3/1977 | Harrison | |
| 4,076,771 | A | | 2/1978 | Houx, Jr. et al. | |
| 4,375,831 | A | | 3/1983 | Downing, Jr. | |
| 4,662,902 | A | | 5/1987 | Meyer-Pittroff | |
| 4,674,561 | A | | 6/1987 | Kelley | |
| 4,936,110 | A | | 6/1990 | Kuckens | |
| 5,081,848 | A | | 1/1992 | Rawlings et al. | |
| 5,386,709 | A | | 2/1995 | Aaron | |
| 5,390,505 | A | | 2/1995 | Smith et al. | |
| 5,435,382 | A | | 7/1995 | Carter | |
| 5,449,036 | A | | 9/1995 | Genge et al. | |
| 5,477,914 | A | | 12/1995 | Rawlings | |
| 5,816,318 | A | | 10/1998 | Carter | |
| 6,070,860 | A | | 6/2000 | Kinney, Jr. et al. | |
| 6,467,298 | B2 | | 10/2002 | Schulak | |
| D465,838 | S | | 11/2002 | Kauffmann et al. | |
| 6,564,864 | B2 | | 5/2003 | Carter et al. | |
| 6,574,980 | B1 | | 6/2003 | Morrison | |
| 6,598,862 | B2 | | 7/2003 | Merrill et al. | |

\* cited by examiner

*Primary Examiner*—Scott Bushey
(74) *Attorney, Agent, or Firm*—Lieberman & Brandsdorfer, LLC

(57) ABSTRACT

The present invention relates to a cooling apparatus and method wherein a supply sump and turbine are below grade. Water cooled from an above grade cooling tower fan and fill flows into the supply sump and is pumped through below grade pipes into a facility. Heat rejected water from the facility then flows through below grade pipes into a below grade collector sump. A collector sump pump pumps the heat rejected water above grade into a nozzle and back into the fill to be cooled. The present invention is constructed such that water is not idle in any above grade component. Accordingly, the risk of water freezing within the above grade components is drastically reduced. Moreover, the heat rejection water can by-pass all above grade components and travel directly into the supply sump in the event of reduced load from the facility.

13 Claims, 6 Drawing Sheets

COLLECTOR SUMP COOLING TOWER

CROSS REFERENCE TO RELATED APPLICATION(S)

This is a non-provisional utility patent application claiming benefit of the filing date of U.S. provisional application Ser. No. 60/635,261 filed Dec. 10, 2004, and titled COLLECTOR SUMP COOLING TOWER.

BACKGROUND OF THE INVENTION

1. Technical Field

The present invention relates to an evaporative cooling tower. More specifically, the invention relates to an improvement to the cooling tower that protects exposed components from elements that may affect reliability and productivity.

2. Description of the Prior Art

Many large industrial processes and laboratories, such as manufacturing plants, convention centers, hospitals, military command centers, and the like, operate 24 hours a day, 7 days a week, every week of the year. In many cases, the economic security, the public health, the public welfare, and the national security of our nation are all dependant upon the continued operation of these facilities. Additionally, many commercial and industrial processes and power plants generate heat that must be removed. It is imperative that a stable atmospheric temperature be maintained within these facilities such that employees may comfortably complete their assigned tasks, regardless of the weather conditions outside of the facility.

Evaporation of water through cooling towers has proven itself to be an effective and generally energy efficient mechanism to cool water that has been heated by a commercial, or industrial process. FIG. 1 illustrates an example of a prior art cooling tower. The cooling tower (10) of FIG. 1 is comprised essentially of a cooling tower fan (15), an evaporative fill (20), a nozzle or hot pan for distributing water to be evaporated across the evaporative fill (25), an above grade sump (30), a below grade water pipe directing cooling water into the facility (35), a below grade water pipe directing warm water from the facility (40), a by-pass valve (50), a by-pass balancing valve (45), and a standpipe riser (55). In operation, warm water is pumped into the fill (20) through the nozzle (25) and is cooled within the fill (20) by evaporation accelerated by air flow generated by the cooling tower fan (15). The cooled water is then stored in the above grade sump (30) and later pumped into a work facility through a below grade water pipe (35) to be used as cooling water by the facility, a process, or equipment. The use of the cooled water by the facility, equipment, or process increases the temperature of the water. In order for the water to continue to cool the work facility, the process, or equipment the water temperature must be reduced and controlled within a specific range, i.e., not too hot, nor too cold. One method for reducing the water temperature within a controlled range of temperatures is to recycle warmed work facility water through the cooling tower. Accordingly, warmed water from the facility travels from within the facility through the below grade pipe (35) to the above grade by-pass valve (50). At the by-pass valve (50), the warm water is either returned to the above grade sump (30) through the by-pass balancing valve (45) or returned to the nozzles or hot pan (25) through the stand-pipe riser (55), depending on the current load or operating status of the cooling tower. In general, the bypass valve (50) is modulated by a motor to vary the proportion of flow up to the tower fill (30) or down to the above grade sump (30) depending on the current load or operating status of the cooling tower.

One drawback of the above prior art is a potential for the above grade elements to freeze during cold weather conditions. Except for below grade pipes (35) and (40), the remaining components in the prior art cooling tower are above grade, and as such are periodically exposed to freezing temperatures. This exposure, together with water, can create a build up of ice on the above-grade components. Both the build up of ice and ice breaking off the cooling tower and falling can cause injury or property damage to the cooling tower (10) and any surrounding property. Additionally, the expansion force of ice formed within the cooling tower has the potential to fracture the cooling tower's components (10). Any or all of these events can drastically disrupt the function of the cooling tower (10) and, more importantly, catastrophically affect the productivity levels of the work facility. As the operation of the facility becomes more critical, such as a hospital, power plant, or military installation, redundant, or standby cooling towers are installed. Freeze protection in the standby equipment may be required for weeks, until there is a need to operate the redundant cooling tower. As a result, many cooling towers require insulation or heating mechanisms to prevent such ice formation. These insulation or heating mechanisms represent an additional cost to the facility and are not completely efficient at preventing ice formation. Accordingly, there is a need for a cost efficient and more reliable solution to the problem created by exposure of cooling tower components to freezing temperatures.

Placing the sump below grade is one solution to prevent freezing of above-grade components. FIG. 2 is a prior art diagram (90) illustrating one such prior art example of this solution. As shown, a cooling tower apparatus (100) is provided with a cooling tower fill (110), a cooling tower fan (105), a nozzle or hot pan (115), an open ended pipe (120), a below grade sump (125), a supply water turbine pump (130), a below grade water pipe directing cooling water into the facility (135), a below grade water pipe directing warm water from the facility (150), a by-pass valve (155), a by-pass balancing valve (140), and a stand pipe riser (145). Much like the prior art illustrated in FIG. 1, in FIG. 2 warm water travels into the cooling tower fill (100), or into the cooling tower (100), through a nozzle or hot pan (115) and is cooled in the fill (110) by a cooling tower fan (105). In one embodiment, the warm water is fed to the cooling tower from a remote work facility. The cooled water travels below grade through the open ended pipe (120) and is stored in the below grade sump (125). The cooled water is then pumped into the work facility through the below grade pipe (135) by the supply water turbine pump (130) to alter the facility's internal temperature. Upon use within the facility, the warmed water then travels from within the facility through the second below grade pipe (150) to the above grade by-pass valve (155). At the by-pass valve (155), the warm water is either returned to the below grade sump (125) through a by-pass balancing valve (140) or returned to the nozzle (115) through the stand-pipe riser (145), depending on the current load or operating status of the cooling tower. In general, the bypass valve (155) is modulated by a motor to vary the proportion of flow up to the tower fill (110) or down to the below grade sump (125) depending on the current load or operating status of the cooling tower.

The beneficial effect of the prior art illustrated in FIG. 2 is that by placing the sump below grade, the sump is insulated from freezing and the protection of the water from freezing becomes passive due to the fact that it is below grade and covered. This increases efficiency because the sump is able to utilize natural insulation provided by the ground and no additional cost is required. Reliability is improved since the heating mechanisms required to prevent the sump water from freezing are eliminated. Additionally, a supply water turbine pump (60) provides a reliable and efficient pump for introducing cooled water into the work facility.

However, freeze protection risks remain with FIG. 2's prior art design where the warm water return piping (150) is exposed to external temperatures when it exits the ground to return to the cooling tower from the facility. The most susceptible components include the by-pass valve (155), the by-pass balancing valve (140) and the stand-pipe riser (145). These components are susceptible to freezing because water can be trapped within these pipes when the valves are rotated to either the normal setting, wherein the warm water returns to the nozzle (15), or in the by-pass setting, wherein the warm water is returned to the sump (125). Freezing of the water within these pipes can lead to freezing and even destruction of the cooling tower components. Although, the by-pass valve (155), the by-pass balancing valve (140) and the stand-pipe riser (145) may be insulated or heated to prevent such ice formation, these insulation or heating mechanisms represent an additional cost to the facility and are not completely efficient at preventing ice formation.

Certain facility processes increase in energy efficiency when the sump water is cooler. In summer, the atmospheric conditions such as temperature and humidity limit the lowest temperature that can be achieved, but in cold weather, the sump temperature can be lowered to just above freezing. This colder supply water dramatically reduces the energy needed to operate the facility. In some cases, the energy efficiency of the mechanical plant can be increased by 20% due to the colder sump water. However, one significant problem with lowering the sump water temperature is freezing. Accordingly, an evaporative cooling tower is needed that reduces complex components and excessive energy waste such that freeze protection of the cooling tower is increased, the cooling tower's reliability is increased and the work facility, process and equipment can reliably maintain an adequate work temperature, regardless of the external temperature.

SUMMARY OF THE INVENTION

The present invention offers a cooling tower apparatus and method that eliminates freezing risks, simplifies operation, reduces energy consumption and increases reliability of a cooling tower.

In one embodiment, a cooling apparatus is provided for an above-grade cooling tower evaporative fill that is adapted to receive and cool heat rejection water. A sump is provided and segmented into a first section and a second section. The first sump section is in communication with the evaporative fill and is adapted to receive water from a system that requires the water to be cooled. The second sump section is positioned adjacent to the first sump section. The second sump section receives either cooled water from the evaporative tower fill or warm water from the first sump section. Water returned from an external supply is delivered to and stored in the first sump section. A partition is provided to separate the first sump section from the section sump section. This partition has a height less than an exterior wall of the first and second sump sections. Excess water return from the first sump section is adapted to pass over the partition to the second sump section.

In another embodiment, an apparatus is provided with a cooling tower in communication with a below grade sump. The sump is divided into a first section separated from a second section. The first sump section is adapted to receive water from an external supply, and the second sump section is adapted to receive water from either the first sump section, an evaporative fill, or both. In addition, a conduit is provided to transport water from the first sump section to the cooling tower, wherein the conduit is free of an obstruction to enable still water to drain to the first sump section.

Other important features of the invention will become apparent from the drawings and detailed description of the invention which follows.

DETAILED DESCRIPTION OF THE INVENTION

Technical Details

Figure 3:
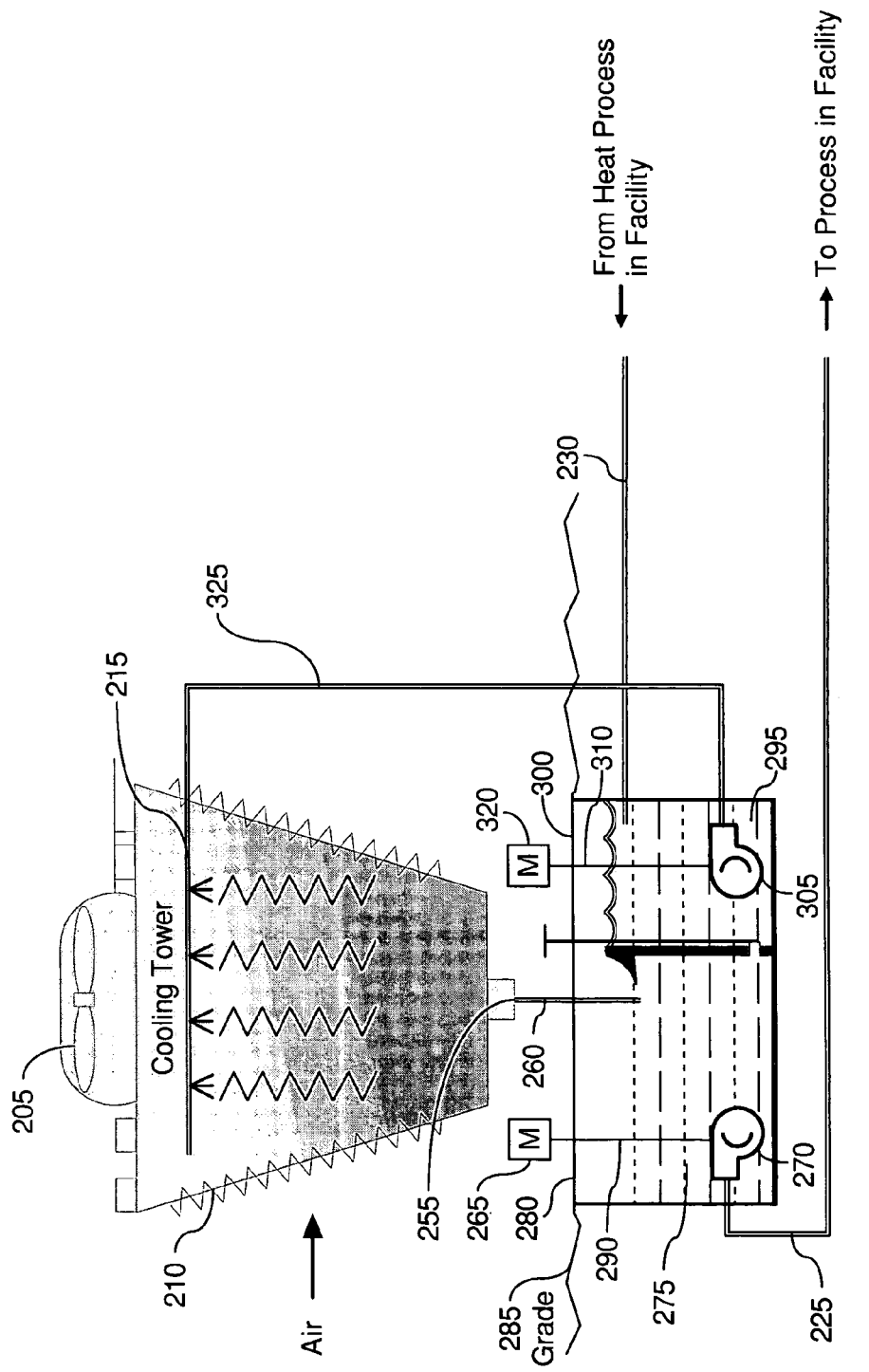
FIG. 3 is a block diagram of a collector sump cooling tower according to the preferred embodiment of this invention, and is suggested for printing on the first page of the issued patent.

Turning now to the preferred embodiment, FIG. 3 is an illustration of the preferred embodiment of the water cooling tower (200). The embodiment shown in FIG. 3 includes an above grade cooling tower fan (205), an above grade fill (210), and an above grade nozzle or hot pan (215). These three components may be arranged in various configurations to enhance getting water distributed on the fill (210) so that air flow from the fan (205) can cause accelerated evaporation. For example, in some cases the water drips down through the fill (210) and the fan air is pulled up; counterflow. In other systems the water drips down through the fill (210) and the air moves across sideways; crossflow. Some systems use fine spray nozzles under pressure, others use holes in the bottom of a long flat pan to distribute the water. Many cooling towers use fans mounted low that force air up through the fill; forced draft. Other towers use fans on the top that pull the air up; induced draft. Very large power plant towers use natural convection and do not have fans; natural draft. In one embodiment, the cooling tower fill (210) is upright and substantially rectangular in shape. The nozzle (215) may enter the fill (210) through either an opening in the fill wall that is proximal to the fill's ceiling or through the fill's ceiling. The cooling tower fan (205) is adjacent to the fill (210) such that it is above the ceiling of the fill (210). The cooling tower fan draws in or forces outside air through an air inlet in the ceiling of the fill (210), past the nozzle (215)

and into the main body of the fill (210). The nozzle (215) introduces the water used by the facility (or heat rejection water) into the fill (210). The fill (210) then acts as an evaporative media surface wherein the heat rejection water is partially evaporated and cooled. In operation, warm water is pumped from the facility through the nozzle (215) and into the fill (210) such that the warm water is cooled by convection currents generated by the cooling tower fan (205). The cooled water then flows through an outlet (255) in the floor of the fill (210) and enters a supply sump (275) through a pipe (260).

The supply sump (275) is proximal to the fill (210). The supply sump (275) is substantially below grade. In one embodiment, the top of the supply sump (275) is substantially sealed by a cover (280) which is flush with the grade (285). A supply water turbine (270) is positioned within the supply sump (275) and is in communication with a motor (265). In one embodiment, the supply water turbine pump (280) is above grade and connected by a shaft (290) to the turbine (270) located within the supply sump (275). In one embodiment, the above grade motor (265) is weatherproof and, therefore, not susceptible to freezing. Furthermore, because the turbine (270) is within the supply sump (275) and below grade, it is insulated from freezing. The supply water pump turbine (270) pumps cooled water from the bottom of the supply sump (275) into the facility through a pipe (225). Similar to the supply sump (275), the pipe (225) is below grade. Thus, it is naturally insulated and is not susceptible to freezing.

Use of the cooled water within the facility increases temperature of the water and makes it necessary for heat rejected water to be recooled by the cooling tower. Warm water or heat rejection water flows from the work facility through a second below grade pipe (230) and into a collector storage sump (295). In one embodiment, the collector storage sump (295) is below grade. The top of the collector storage sump (295) is substantially sealed by a cover (300) which is flush with the grade (285). The collector storage sump (295) includes a collector sump tower pump (305) in communication with a motor (320) connected by a shaft (310) within the collector storage sump (295). In one embodiment, the collector motor (320) is above grade and weatherproof and, therefore, not susceptible to freezing. Similarly, in one embodiment the motor (320) is below grade within the collector storage sump (295), and is therefore insulated from freezing by the ground. In operation, the motor (320) pumps heat rejection water from the collector storage sump (295) to the nozzle (215) through the standpipe riser (325). In one embodiment, the standpipe riser (325) extends from a below grade floor of the collector storage sump (295) to the above grade nozzle (215) and fill (210). Accordingly, a large portion of the standpipe riser (325) is exposed to the atmosphere and weather conditions.

In one embodiment, the water pumped from the collector storage sump (295) is not idle within the standpipe riser (320). Rather, when the standpipe riser (325) is in use, water constantly flows from the collector storage sump (295) to the nozzle (215). This constant flow of the water prevents the water from remaining idle in the standpipe riser (325) and dramatically reduces the ability of water to freeze within the standpipe riser (325) during cold conditions. In one embodiment, there is no obstruction in the standpipe riser (325). If the collector sump tower pump (305) ceases to function or is turned off, then all of the heat rejection water drains back into the collector storage sump (295). By preventing any water from remaining within the above grade standpipe riser (325), risk of damage to the standpipe riser (325) through ice formation is substantially limited. In an alternative embodiment, the standpipe riser (325) may be additionally insulated as a precautionary measure. Furthermore, fluid flow through the standpipe riser may be controlled in a variety of ways, including the use of a variable speed drive, or an apparatus or method to vary the volume of flow over the evaporative fill and subsequently the cooling capacity of the fill.

Figure 1:
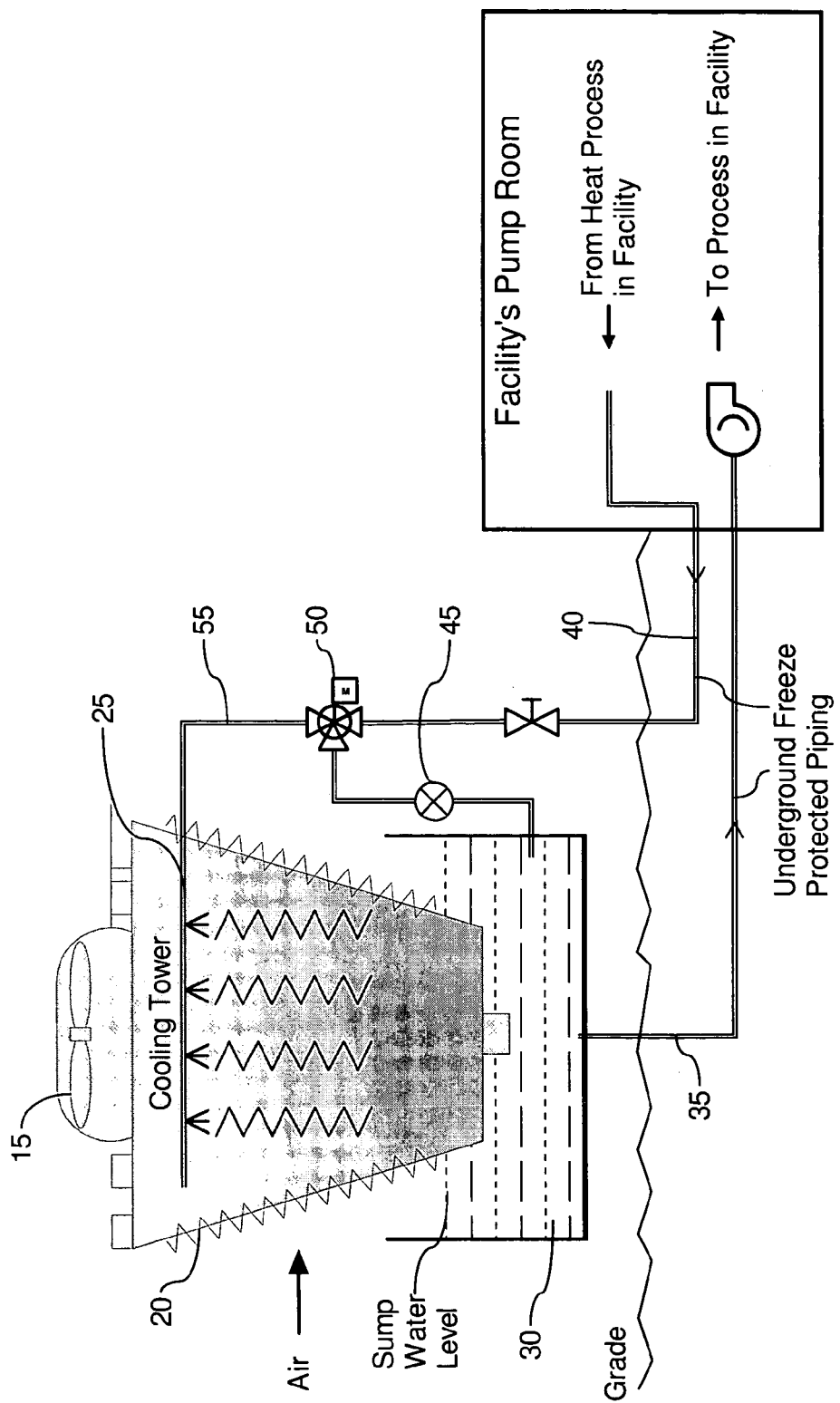
FIG. 1 is a prior art block diagram wherein all working components are above grade.
Figure 2:
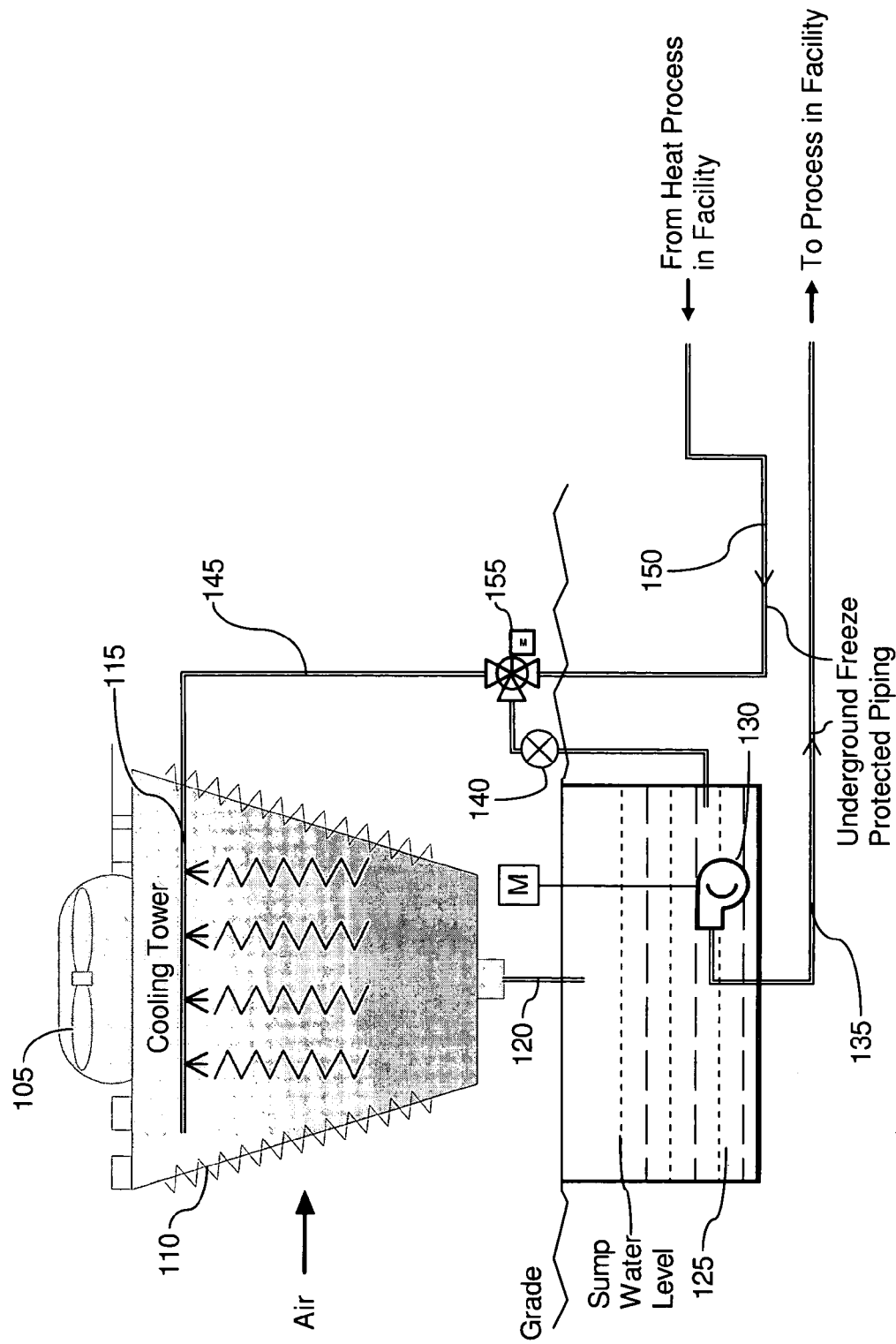
FIG. 2 is a prior art block diagram wherein the collector sump is below grade and a by-pass valve, by-pass balancing valve, and the stand-pipe riser are all above grade.
Figure 4:
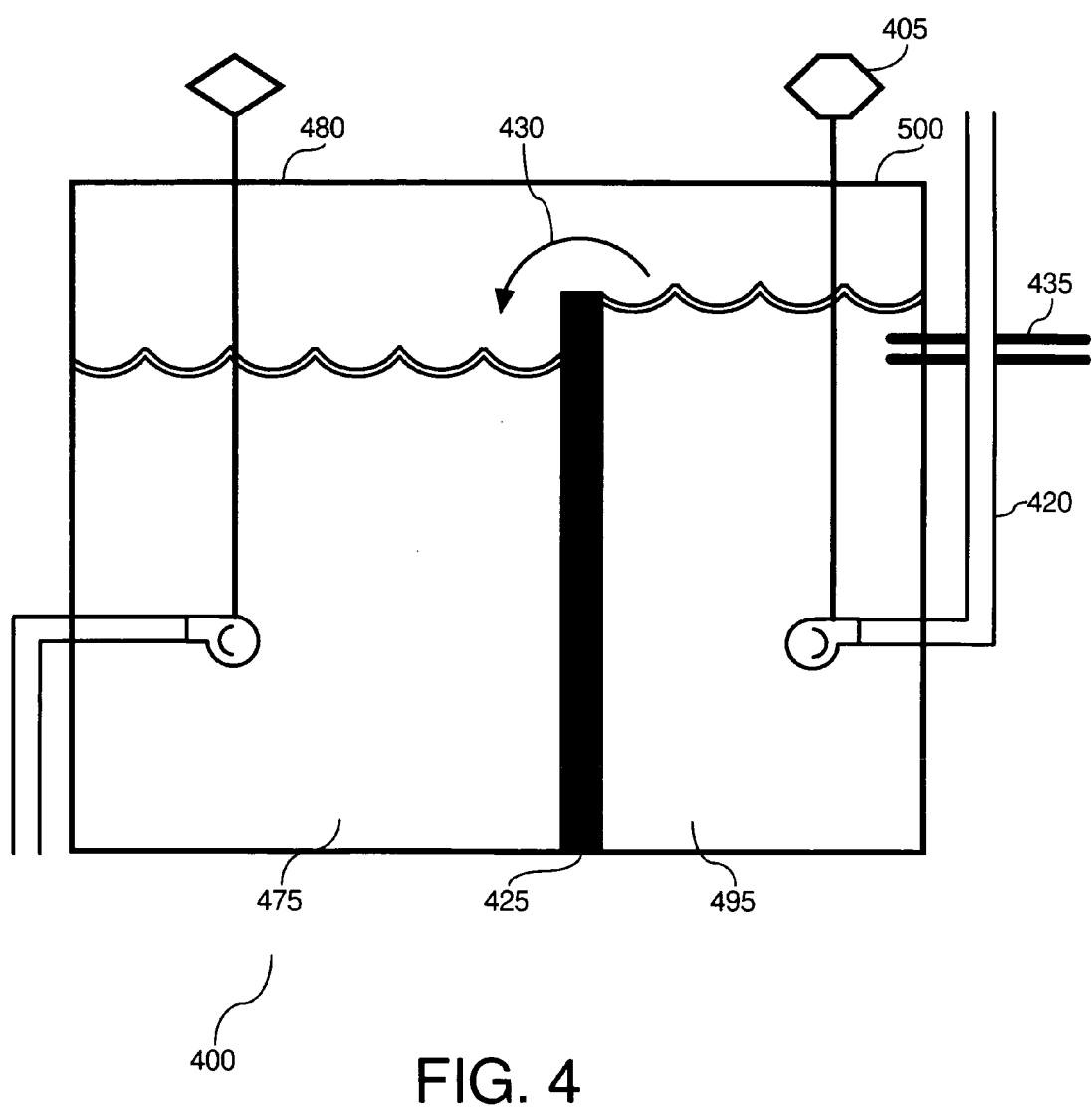
FIG. 4 is a block diagram of a below grade collector sump and supply sump with a collector sump partition configured to stratify the heat rejected water in the event it bypasses the standpipe riser

FIG. 4 is a block diagram (400) of one embodiment showing a supply sump (475) and the collector storage sump (495) juxtaposed to one another and separated by a common wall or collector sump partition (425). The collector sump partition (425) is sized to be higher than the water level of the supply sump (475) but below the height of both the collect sump's and supply sump's walls and cover (480, 500). The structure of the collector sump partition (425) operates to allow heat rejection water that enters the collector sump from the facility through the below grade pipe (435) to by-pass, instead of being pumped into the standpipe riser (420). The warm water bypasses directly into the supply water storage sump (475) over the top of the collector sump partition (425). For example, during either capacity control for cold weather conditions or other low load conditions, the collector sump tower pump (405) may be turned off or the flow minimized and the heat rejection water level of the collector storage sump (495) may be caused to rise up and traverse the level of the collector sump partition (425), as indicated by reference (430). The heat rejection water within the collector storage sump (495) mixes with the cooled water of the supply sump (475) in a below grade bypass of the nozzle (not shown) and fill (not shown). Since this bypass is below grade, the water is naturally insulated and the risk of idle water freezing and damaging the cooling tower (not shown) is substantially eliminated. Additionally, the complex controls and bypass valve, shown in FIGS. 1 and 2 are eliminated. Accordingly, the supply sump may receive cooling water from the evaporative fill, or from the collector sump (495).

In one embodiment the flow in the collector sump tower pump (405) is minimized such that heat rejection water is pumped into the standpipe riser (420) but at a flow that is less than the warm heat rejection flow entering the collector sump (495) from the facility through the below grade pipe (435), and traverses a collector sump partition (425), as indicated by reference (430). This allows the cooling tower (not shown) to function at a reduced capacity for continued cooling at a reduced load while preventing a overload of heat rejection water in a collector storage sump (495).

Figure 5:
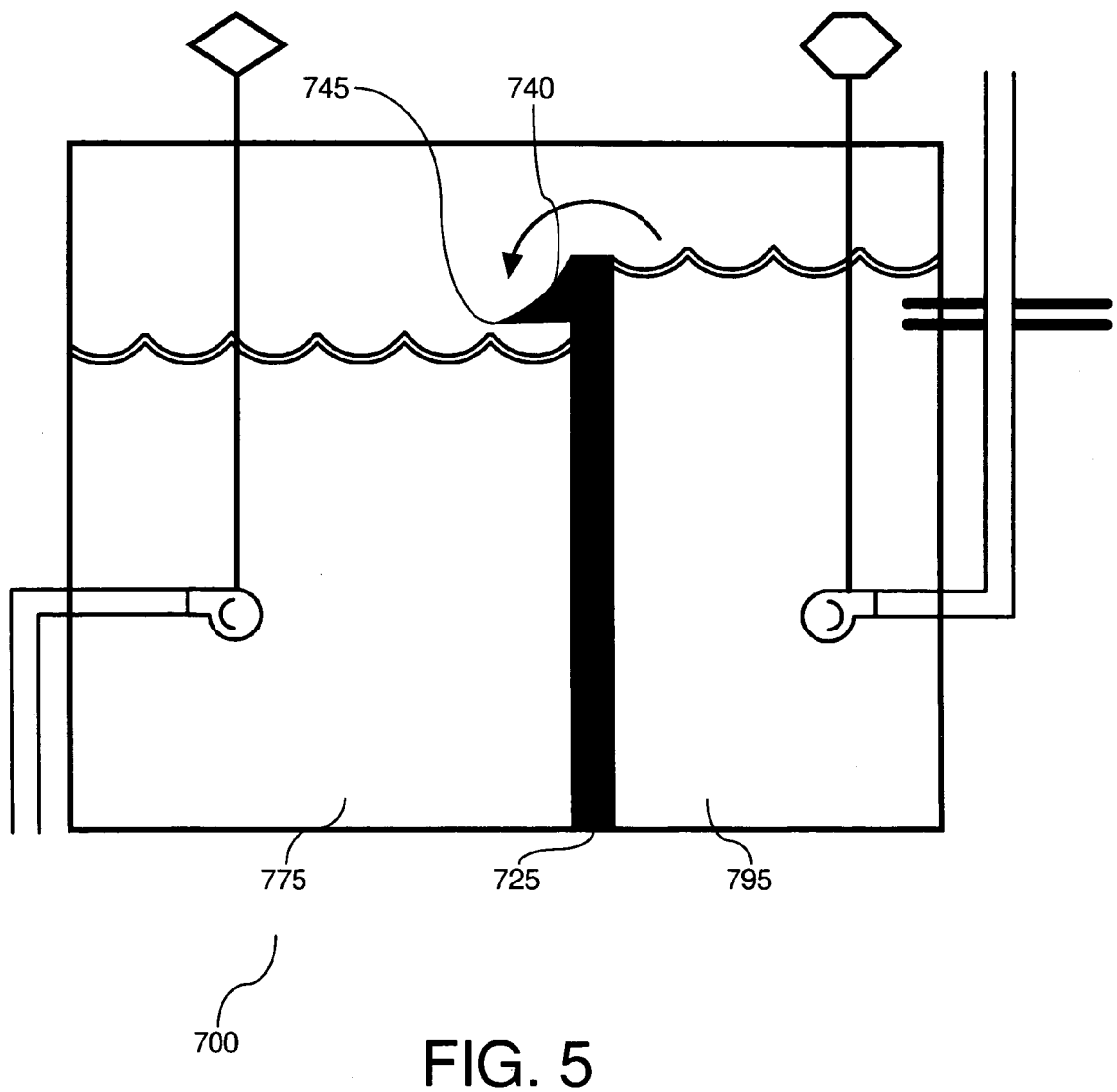
FIG. 5 is a block diagram of a below grade collector sump and supply sump with a collector sump spillway.

FIG. 5 is a block diagram (700) of one embodiment of a collector sump partition spillway (740) attached to a collector sump partition (725). The collector sump partition spillway (740) is attached to a collector sump partition (725) proximal to a storage sump (775). The collector sump partition spillway (740) functions to enhance mixing of heat rejection water into the supply sump (775) such that the heat rejection water can mix with the cooled water when it traverses the collector sump partition (725). In one embodiment, the collector sump partition spillway (740) is triangular in shape with the angle of the hypotenuse leg gradually decreasing with respect to the horizontal axis (745). Water flows from a collector storage sump (795) across the collector sump partition spillway (740), down the hypotenuse of the collector sump spillway (745), and mixes with the cooled water in the storage sump (775). In an alternative embodiment, the collector sump partition spillway (740) may be eliminated such that the top of the collector sump partition (725) is rectangular, as shown in FIG. 4. This facilitates the stratification of the heat rejected water and the cooled water within the storage sump (775). The effect of this stratification is to minimize mixing with the cool supply water and provide a thermal reserve of cool water.

Figure 6:
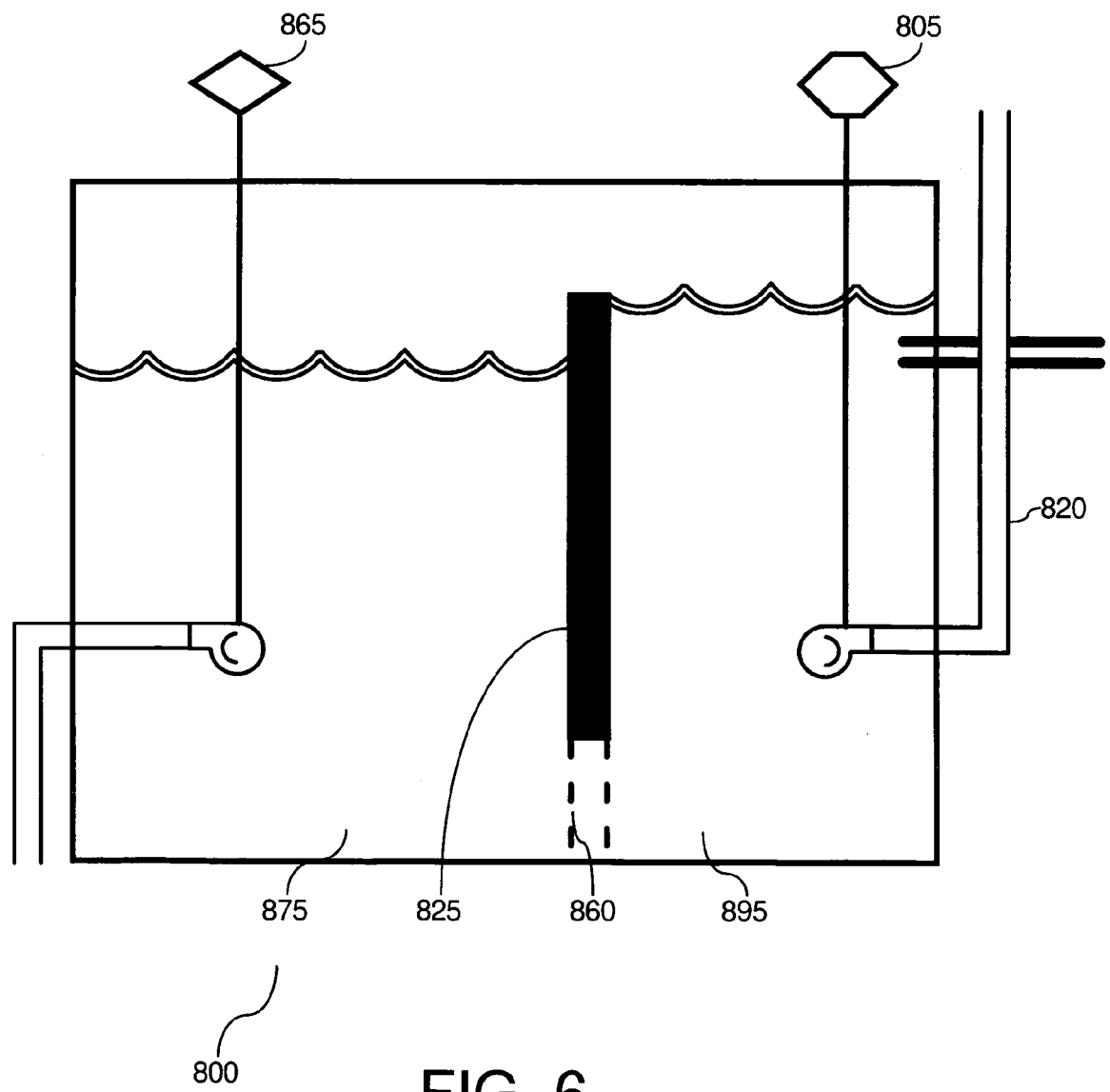
FIG. 6 is a block diagram of a below grade collector sump and supply sump with an emergency bypass.

FIG. 6 is a block diagram (800) showing one embodiment of an emergency bypass gate (860) located at the bottom of the collector sump partition (825). The emergency bypass gate (860) prevents damage to the collector sump tower pump (805) in the event of failure of the supply water turbine pump (865). If the supply water turbine pump (865) fails while the collector sump tower pump (805) is operating, the collector sump tower pump (805) can potentially pump all of the heat rejection water out of the collector storage sump (895) and into the standpipe riser (820). This will empty the collector storage sump (895) and dramatically increases the risk of damage to the collector sump tower pump (805). In response to the failed supply water turbine pump (865), the emergency bypass gate (860) removes the partition between the storage sump (875) and the collector storage sump (895). This, in turn, allows the cooled water from the storage sump (875) to flow back into the collector storage sump (895) and prevent the collector sump tower pump (805) from pumping the collector storage sump (895) dry. In one embodiment, the emergency bypass gate (860) may be in the form of a weir gate, a sluice gate, a ball valve, a wafer valve, or a motor to automate operation of the valve. The emergency bypass can be enabled in a variety of ways, by monitoring the operation of the supply water turbine pump and by monitoring the level of the collector sump, For example, the emergency bypass in the form of a weir gate may be lifted by a helical screw type rod like a worm gear. In another example, if the emergency bypass is in the form of a ball or wafer valve, the valve is rotated open by a shaft. Accordingly, there are different forms and configurations of an emergency bypass valve.

Advantages Over the Prior Art

Elements of an evaporative cooling apparatus are modified to prevent freezing or damage to susceptible elements. For example, several components have been placed below ground and are protected through natural insulation. Those elements that are not below grade are either insulated or modified so that water passing through such elements does not remain stationary. For example, all obstructions have been removed from the standpipe riser to enable water to flow to naturally reverse and enter the collector sump in the event of failure of the collector sump tower pump. The water reverses during normal operation when the collector sump tower pump is turned off to adjust for low load or cold weather operation; to modulate the capacity of the tower. Similarly, a spillway is provided along the partition between the collector sump and the supply sump. The spillway enhances mixing of fluids to naturally cool warmer fluid in the event of failure to pump water through the standpipe riser, or in the event too much water is present in the collector sump than can be managed by the collector sump tower pump.

Alternative Embodiments

It will be appreciated that, although specific embodiments of the invention have been described herein for purposes of illustration, various modifications may be made without departing from the spirit and scope of the invention. In particular, the collector sump partition wall could be full height but contain penetrations in the wall that would allow warm collector sump water to be delivered to the cold sump. Also, with respect to the sump, the collector sump and the supply sump may be two separate and independent tanks rather than one unit, as longs as the alignment of the tanks preserve the overflow of water from the collector sump to the supply sump. In another embodiment the fans that supply air to the fill could be variable speed and the collector sump turbine pump could be constant speed to vary the evaporative capacity. Furthermore, the sump pumps may be submersible in a fluid such that both the pump and the motor are submerged in the sump. Methods, other than the opening and valve in the collector sump wall could be used to protect the collector sump turbine pump such as flow meters that monitor the flow on the cold supply sump turbine pump and annunciate and alarm, or emergency automated action, when the hot collector sump pump is pumping more flow than the cold supply water pump. Accordingly, the scope of protection of this invention is limited only by the following claims and their equivalents.

I claim:

1. A cooling apparatus comprising:
    a single non-partitioned above grade cooling tower evaporative fill adapted to receive and cool heat rejection water;
    a below grade sump segmented into a first section and a second section;
    said first sump section, in communication with said evaporative fill, adapted to receive water from a system that requires said water to be cooled;
    said second sump section positioned adjacent to said first sump section adapted to limit receipt of water to an element selected from a group consisting of: cooled water from said evaporative tower fill, and warm water from said first sump section, and combinations thereof;
    water return from an external supply adapted to be delivered below grade to and stored in said first sump section;
    a partition adapted to separate said first sump section from said second sump section, said partition having a height less than an exterior wall of said sump sections; and
    excess water return from said first sump section adapted to pass over said partition to said second sump section.

2. The cooling apparatus of claim 1, further comprising a spillway in communication with said partition, wherein said spillway is adapted to mix said excess water from said first sump section with cooled water in said second sump section.

3. The cooling apparatus of claim 2, wherein said spillway is mounted adjacent to said partition in said second sump section.

4. The cooling apparatus of claim 1, further comprising a valve in communication with said partition to control fluid flow from said second sump section to said first sump section.

5. The cooling apparatus of claim 4, wherein said valve is selected from a group consisting of: a weir gate, a sluice gate, a ball valve, wafer valve or equivalent, and a motor to automate the operation of the valve.

6. The cooling apparatus of claim 1, wherein said water return is supplied to said first sump section by means of a below grade conduit.

7. The cooling apparatus of claim 1, further comprising a first pump in communication with said first sump section adapted to deliver said water return to said evaporative fill independent of an obstruction.

8. The apparatus of claim 7, further comprising a variable speed drive to vary a volume of water flow from said first pump section to said evaporative fill.

9. The cooling apparatus of claim 1, further comprising a second pump in communication with said second sump section adapted to deliver water to an external destination, wherein said water originates from a location selected from a group consisting of: said evaporative fill, a mixture of cooled water from said evaporative fill and warm water that has overflowed from said first sump section into said second sump section.

10. The cooling apparatus of claim 8, further comprising a below grade conduit adapted to deliver said cooled water.

11. An apparatus comprising:
 a cooling tower in communication with a below grade sump;
 said sump having a first section separated from a second section;
 said first sump section is adapted to receive water from an external supply by a below grade conduit, and said second sump section is restricted to only receive water from an element selected from a group consisting of: said first sump section, an evaporative fill, and combinations thereof;
 a conduit adapted to transport water from said first sump section to said evaporative fill, wherein said conduit is free of an obstruction to enable still water to drain to said first sump section.

12. The apparatus of claim 11, further comprising a spillway mounted between said first and second sump sections to enhance mixing of fluids from said first sump section to said second sump section.

13. The apparatus of claim 11, further comprising a valve in communication with said first and second sump sections to control fluid flow from said second sump section to said first sump section.

* * * * *